US006985457B2

(12) United States Patent
Zeira et al.

(10) Patent No.: US 6,985,457 B2
(45) Date of Patent: *Jan. 10, 2006

(54) DYNAMIC LINK ADAPTION FOR TIME DIVISION DUPLEX (TDD)

(75) Inventors: Eldad Zeira, Huntington, NY (US); Stephen E. Terry, Northport, NY (US); Ariela Zeira, Huntington, NY (US)

(73) Assignee: InterDigital Technology Corp., Wilmington, DE (US)

( * ) Notice: Subject to any disclaimer, the term of this patent is extended or adjusted under 35 U.S.C. 154(b) by 429 days.

This patent is subject to a terminal disclaimer.

(21) Appl. No.: 10/152,104

(22) Filed: May 21, 2002

(65) Prior Publication Data

US 2003/0031145 A1   Feb. 13, 2003

Related U.S. Application Data

(60) Provisional application No. 60/311,710, filed on Aug. 10, 2001.

(51) Int. Cl.
*H04B 7/185* (2006.01)

(52) U.S. Cl. .................. 370/318; 370/335; 370/336; 370/332; 455/522; 455/574

(58) Field of Classification Search ................ 370/310, 370/314.3, 18, 320, 332, 321, 335, 336, 342, 370/345, 347, 465, 433, 437, 441, 442; 375/259, 375/295, 370, 130, 138, 346; 455/522, 69, 455/421, 13.4, 574, 127.1, 127.5, 343.5

See application file for complete search history.

(56) References Cited

U.S. PATENT DOCUMENTS

| 4,007,334 A | | 2/1977 | McDonald |
| 5,396,496 A | * | 3/1995 | Ito et al. ................. 370/314 |
| 5,640,395 A | | 6/1997 | Hamalainen et al. |
| 2002/0016177 A1 | * | 2/2002 | Miya et al. ............. 455/522 |
| 2002/0001617 A1 | | 7/2002 | Miya et al. |
| 2003/0189972 A1 | * | 10/2003 | Berens et al. ............ 375/148 |

FOREIGN PATENT DOCUMENTS

| EP | 0 466 139 A2 | 1/1992 |
| KR | 92-3687 | 2/1992 |
| KR | 97-19170 | 4/1997 |
| KR | 2001-0070186 | 7/2001 |
| WO | 93/15573 | 8/1993 |

OTHER PUBLICATIONS

Toru Inoue et al 20001 IEEE (0-7803-6728-6/01) DS-CDMA and Adaptive Modulation Based TDMA Dual Mode Scheme for High Speed Data Transmission Service in Wireless Multimedia Communication Systems, pp. 585-589.*

(Continued)

*Primary Examiner*—Wellington Chin
*Assistant Examiner*—Raj Jain
(74) *Attorney, Agent, or Firm*—Volpe and Koenig, P.C.

(57) ABSTRACT

A UE system implements dynamic link adaptation by adding or changing control information to notify a receiver which timeslots and codes are currently active and which timeslots should be avoided. The UE provides synchronization such that the receiver knows which timeslots and codes the UE has used to map the coded composite transport channel onto physical channels. The UE attempts to avoid the timeslots which are experiencing transmission difficulties, while attempting to utilize the timeslots which are not experiencing transmission problems.

19 Claims, 7 Drawing Sheets

| CODE | \\ TIMESLOT \\ | | | | | | | | | | | |
|---|---|---|---|---|---|---|---|---|---|---|---|---|
| | S1 | S2 | S3 | S4 | S5 | S6 | S7 | S8 | S9 | S10 | S11 | S12 |
| 0 | | | | A1 | | A6 | A11 | | | | | |
| 1 | | | | A2 | | A7 | A12 | | | | | |
| 2 | | | | A3 | | A8 | | | | | | |
| 3 | | | | A4 | | A9 | | | | | | |
| 4 | | | | A5 | | A10 | | | | | | |
| 5 | | | | | | | | | | | | |
| 6 | | | | | | | | | | | | |
| 7 | | | | | | | | | | | | |

OTHER PUBLICATIONS

Inoue et al., "DS-CDMA and Adaptive Modulation Based TDMA Dual Mode Scheme for High Speed Data Transmission Service in Wireless Multimedia Communication Systems," VTC 2001 Spring, IEEE VTS 53rd , Vehicular Technology Conference, Rhodes, Greece, May 6-9, 2001.
"Transmission of TFCI Bits for TDD," TSG-RAN WG1 Meeting 9, http://www.3gpp.org/ftp/lsg __ran/wg1__rl1/tsgr1__09/docs/pdfs/r1-99i92.pdf, Dec. 1999.

Inoue et al., "DS-CDMA and Adaptive Modulation Based TDMA Dual Mode Scheme for High Speed Data Transmission Service in Wireless Multimedia Communication Systems," VTC 2001 Spring, IEEE VTS 53rd , Vehicular Technology Conference, Rhodes, Greece, May 6-9, 2001.
"Transmission of TFCI Bits for TDD," TSG-RAN WG1 Meeting 9, http://www.3gpp.org/ftp/lsg __ran/wg1__rl1/tsgr1__09/docs/pdfs/r1-99i92.pdf, Dec. 1999.

* cited by examiner

| CODE | TIMESLOT | | | | | | | | | | | |
|---|---|---|---|---|---|---|---|---|---|---|---|---|
| | S1 | S2 | S3 | S4 | S5 | S6 | S7 | S8 | S9 | S10 | S11 | S12 |
| 0 | ▨ | ▨ | ▨ | A1 | A6 | A11 | | ▨ | ▨ | ▨ | ▨ | ▨ |
| 1 | ▨ | ▨ | ▨ | A2 | A7 | A12 | | ▨ | ▨ | ▨ | ▨ | ▨ |
| 2 | ▨ | ▨ | ▨ | A3 | A8 | | | ▨ | ▨ | ▨ | ▨ | ▨ |
| 3 | ▨ | ▨ | ▨ | A4 | A9 | | | ▨ | ▨ | ▨ | ▨ | ▨ |
| 4 | ▨ | ▨ | ▨ | A5 | A10 | | | ▨ | ▨ | ▨ | ▨ | ▨ |
| 5 | ▨ | ▨ | ▨ | ▨ | ▨ | ▨ | ▨ | ▨ | ▨ | ▨ | ▨ | ▨ |
| 6 | ▨ | ▨ | ▨ | ▨ | ▨ | ▨ | ▨ | ▨ | ▨ | ▨ | ▨ | ▨ |
| 7 | ▨ | ▨ | ▨ | ▨ | ▨ | ▨ | ▨ | ▨ | ▨ | ▨ | ▨ | ▨ |

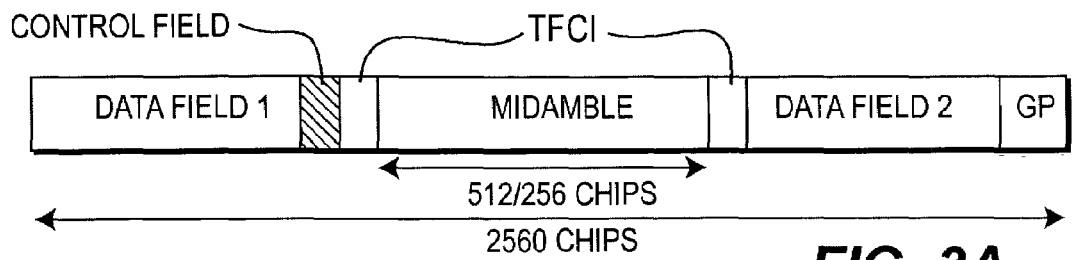
*FIG. 3A*
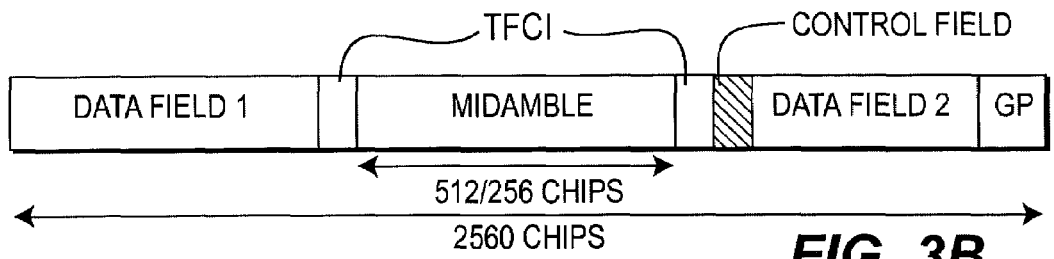
*FIG. 3B*
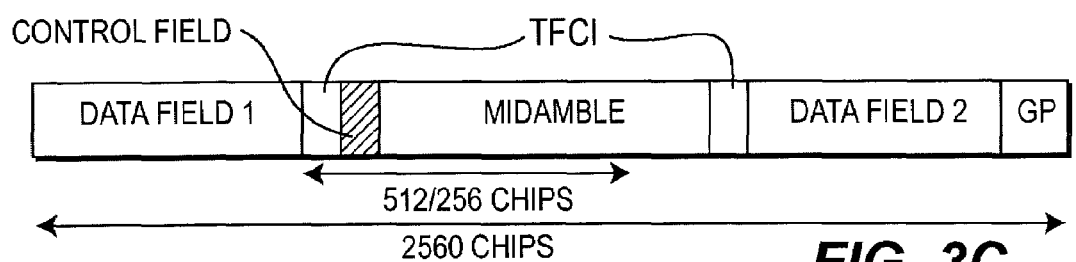
*FIG. 3C*
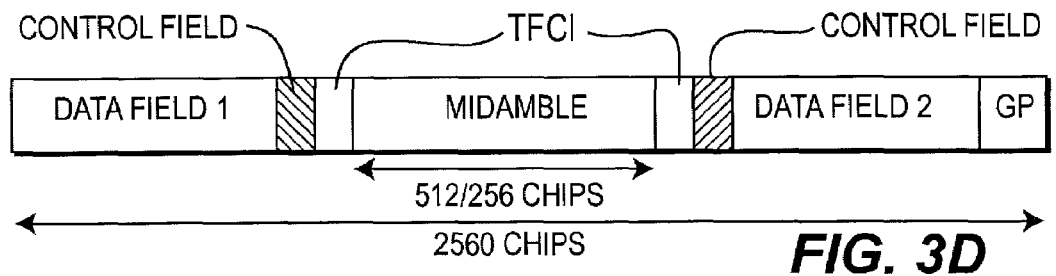
*FIG. 3D*
| CODE | TIMESLOT | | | | | | | | | | | |
|---|---|---|---|---|---|---|---|---|---|---|---|---|
| | S1 | S2 | S3 | S4 | S5 | S6 | S7 | S8 | S9 | S10 | S11 | S12 |
| 0 | | | | A1 | | A6 | A11 | | | | | |
| 1 | | | | A2 | | A7 | A12 | | | | | |
| 2 | | | | A3 | | A8 | | | | | | |
| 3 | | | | A4 | | A9 | | | | | | |
| 4 | | | | A5 | | A10 | | | | | | |
| 5 | | | | | | | | | | | | |
| 6 | | | | | | | | | | | | |
| 7 | | | | | | | | | | | | |
*FIG. 3E*

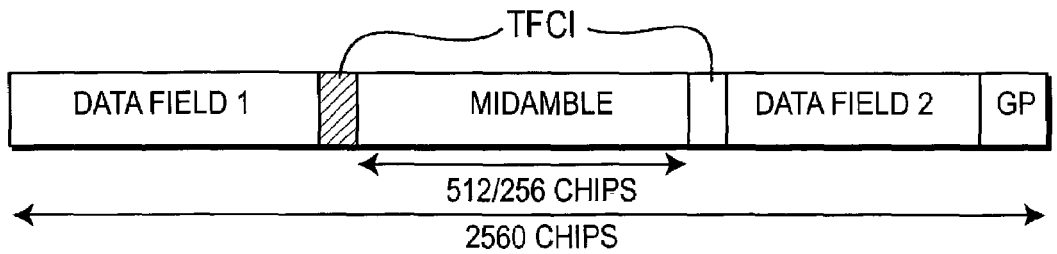
FIG. 4A
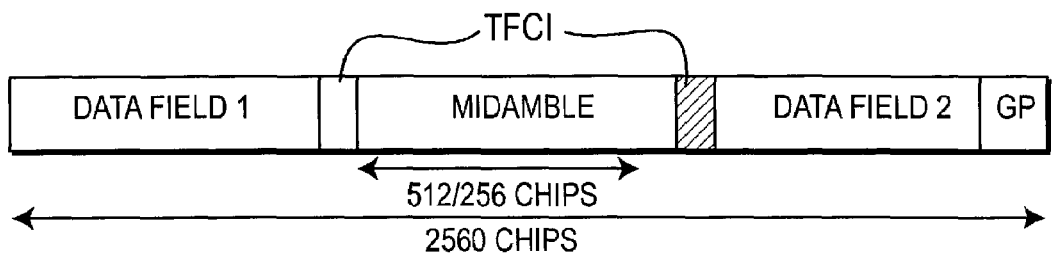
FIG. 4B
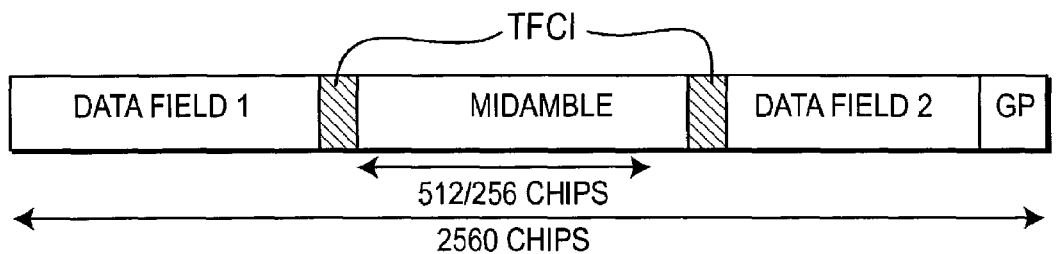
FIG. 4C
FIG. 4D

FIG. 5G
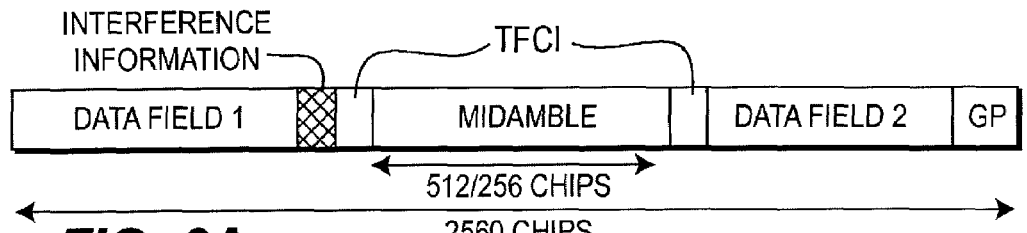
FIG. 6A
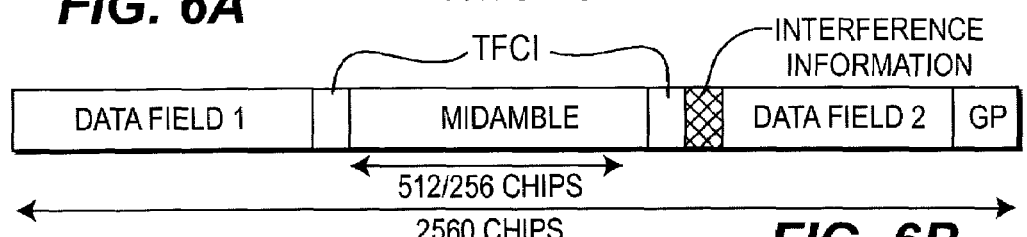
FIG. 6B
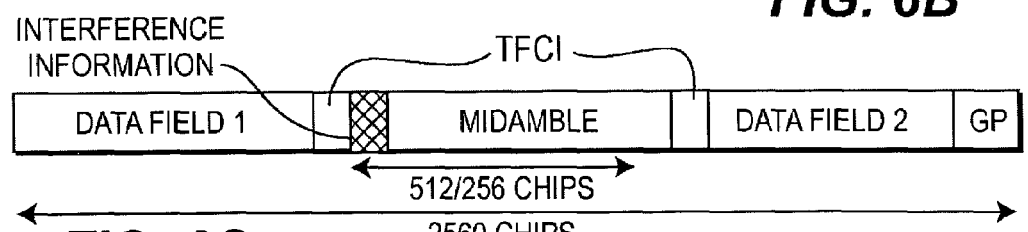
FIG. 6C
FIG. 6D

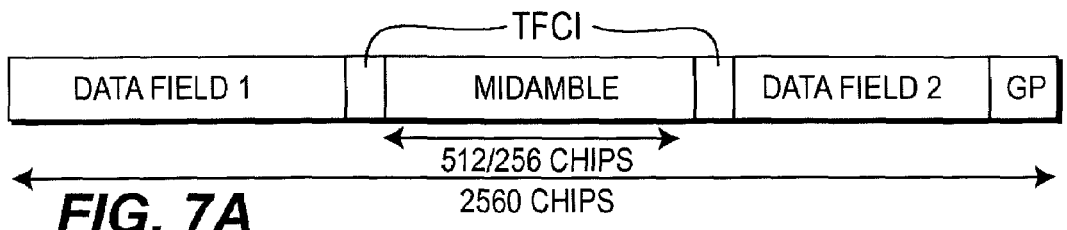
FIG. 7A
FIG. 7B
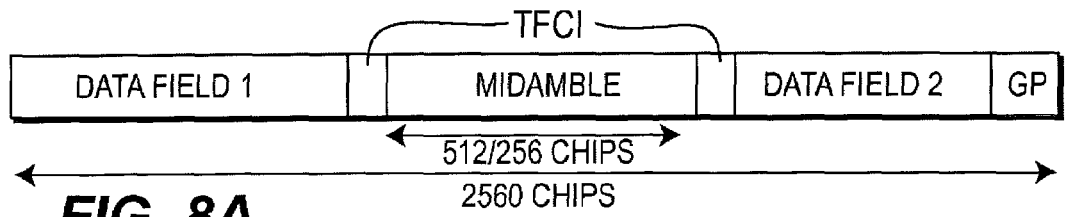
FIG. 8A
FIG. 8B
FIG. 8C

DYNAMIC LINK ADAPTION FOR TIME DIVISION DUPLEX (TDD)

CROSS REFERENCE TO RELATED APPLICATIONS

This application claims priority from U.S. Provisional Patent Application Ser. No. 60/311,710 filed Aug. 10, 2001.

BACKGROUND

The present invention relates to the field of wireless communications. More particularly, the present invention relates to a time division duplex (TDD) communication system which uses dynamic link adaptation for transmissions between user equipment (UE) and a base station (BS) to adjust for changing propagation conditions.

Third generation (3G) cellular systems are able to transmit a wide range of services, from high data rate services such as video and Internet downloads, to low data rate services such as speech. Referring to FIG. 1, a plurality of user services are shown as individual data streams. These individual data streams are assigned to transport channels A, B, C, whereby the data streams are coded and multiplexed. Each transport channel A, B, C is assigned a specific coding rate and a specific transmission time interval (TTI). The coding rate determines the number of transmitted bits of the physical layer, and the TTI defines the delivery period of the block of data to be transmitted. For example, the TTI may be either 10, 20, 40 or 80 ms.

Multiple transport channels A, B, C are multiplexed together into a coded composite transport channel (CCTrCh). Since the CCTrCh is made up of a plurality of transport channels A, B, C, it may have a plurality of different coding rates and different TTIs.

For example, transport channel A may have a 20 ms TTI and transport channel B may have a 40 ms TTI. Accordingly, the formatting of transport channel A in the first 20 ms and the formatting of transport channel A in the second 20 ms can change. In contrast, since transport channel B has a 40 ms TTI, the formatting, and hence the number of bits, are the same for each 20 ms period over the 40 ms TTI duration. It is important to note that all of the transport channels A, B, C are mapped to the CCTrCh on a TTI basis, using the smallest TTI within the CCTrCh. The transmit power is ultimately determined based on transport format combination applied in the smallest TTI within the CCTrCh.

It should be noted by those of skill in the art that each individual data stream will have an associated data rate, and each physical channel will have an associated data rate. Although these data rates are related to each other, they are distinctly different data rates.

Once the smallest TTI within the CCTrCh has been established, it must be determined how many bits of data will be transmitted and which transport channels will be supported within a given TTI. This is determined by the formatting of the data.

A transport format combination (TFC) is applied to each CCTrCh based on the smallest TTI. This essentially specifies for each transport channel how much data is transmitted in a given TTI and which transport channels will coexist in the TTI.

A TFC set is the set of all of the possible TFCs. If the propagation conditions do not permit all of the possible TFCs within the TFC set to be supported by the UE, a reduced set of TFCs which are supported by the UE is created. This reduced set is called a TFC subset. TFC selection is the process used to determine which data and how much data for each transport channel A, B, C to map to the CCTrCh. A transport format combination indicator (TFCI) is an indicator of a particular TFC, and is transmitted to the receiver to inform the receiver which transport channels are active for the current frame. The receiver, based on the reception of the TFCIs, will be able to interpret which physical channels and which timeslots have been used. Accordingly, the TFCI is the vehicle which provides coordination between the transmitter and the receiver such that the receiver knows which physical transport channels have been used.

In TDD, the UE typically calculates the required transmit power based upon a signal to interference ratio (SIR) target that it receives from the base station. Knowing the TFC selected, the UE calculates the required transmission power. If the RF propagation conditions are optimal, a TFC will be selected such that the maximum number of bits are transmitted in each timeslot. However, as RF propagation conditions deteriorate and the UE calculates a required power that is higher than the maximum allowable power of the UE in order to transmit all of the desired information, a different set of TFCs, (i.e., the aforementioned TFC subset), must be selected which will be supportable by the maximum allowable power of the UE. This ultimately reduces the amount of data that the physical layer has to support, and reduces the power requirement.

In summary, the system chooses on a TTI basis which transport channels will be active and how much data will be transmitted in each one. The TFC selection process takes into account the physical transmission difficulties, (maximum allowable power being one), and reduces the physical transmission requirements for some time duration.

After the multiple transport channels A, B, C are combined into a single CCTrCh, the CCTrCh is then segmented and those segments are mapped separately onto a number of physical channels. In TDD systems, the physical channels may exist in one, or a plurality of different timeslots, and may utilize a plurality of different codes in each timeslot. Although there are as many as 16 possible codes in a timeslot in the downlink, it is more typical to have, for example, 8 codes in a particular downlink in a particular timeslot. In the uplink, there is rarely more than two codes in a particular timeslot. In any event, there are a number of physical channels defined by a plurality of codes in a plurality of timeslots. The number of physical channels can vary.

In the Universal Mobile Telecommunications System (UTMS) time division duplex (TDD) mode, the CCTrCh is mapped onto the physical channels by assigning the timeslots and the codes in consecutive order. For example, the first timeslot is selected for mapping. The first code of the first timeslot is assigned first, and then the remaining codes of the first timeslot are each assigned consecutively until the last code has been assigned. Once all of the codes from the first timeslot are assigned, the second timeslot is entered. The mapping process is repeated using each of the codes from the second timeslot consecutively until they have all been assigned.

The mapping process for a specific user equipment (UE) under UMTS is shown in the example of FIG. 2A having 12 timeslots (S1–S12), 8 codes in each timeslot (0–7), and 12 total codes ($A_{1-A12}$) to be allocated/configured. Those codes and timeslots that are shown as "shaded" are considered, for purposes of illustration, not to be allocatable to the present UE, (since they may have been allocated to other UEs). The allocatable portions of timeslots S4–S7 will be assigned in consecutive order starting at timeslot S4, and codes 0–4 in each timeslot will be also assigned in consecutive order. Assuming that 12 codes will be mapped in this manner, the result is a mapping shown in FIG. 2A with code $A_1$ being assigned first and code $A_{12}$ being assigned last.

Although the prior art process shown in FIG. 2A provides one option for mapping the data from the CCTrCh onto the physical channels, there are some drawbacks with this process when transmission problems are encountered within a single timeslot, for example, when the desired transmission power exceeds the maximum allowable UE power. The process of consecutive assignment of timeslots and codes for mapping the CCTrCh onto the physical channels as set forth in the UMTS-TDD standard tends to exaggerate the problems when a transmission problem occurs. By way of illustration, due to the consecutive manner in which timeslots are allocated/configured when a transmission problem occurs, it typically occurs in one or several of the earlier timeslots. When the system detects a problem, for example, when the desired transmission power exceeds the maximum allowable UE power for a certain TTI, the system selects new TFCs such that the data requirements on all of the timeslots are reduced. Since the UMTS-TDD standard specifies that timeslots are assigned consecutively, if the transmission problem is in one of the first several timeslots, the system will still begin packing data into the earlier timeslots, where the problem is at its worst, and will leave the last timeslots relatively empty, where there are no transmission problems.

As a result, the system exacerbates the problem since data rate requirements are lowered on the timeslots where there is not a problem, and timeslots that have a problem will still be packed with data. This is an inefficient utilization of the radio resources.

SUMMARY

The present invention is a TTD UE which implements dynamic link adaptation by adding or changing control information to notify the receiver which timeslots and codes are currently active and which timeslots should be avoided. Thus, the UE provides synchronization such that the receiver knows which timeslots and codes the UE has used to map the CCTrCh onto physical channels. The UE attempts to avoid the timeslots which are experiencing transmission difficulties, while attempting to utilize the timeslots which are not experiencing transmission problems.

BRIEF DESCRIPTION OF THE DRAWING(S)

FIG. 3A is a data burst structure of the first embodiment having a control field located in data field 1.

FIG. 3B is a data burst structure of the first embodiment having a control field located in data field 2.

FIG. 3C is a data burst structure of the first embodiment having a control field located in the midamble.

FIG. 3D is a data burst structure of the first embodiment having a control field located in both data fields.

FIG. 3E is an example allocation/configuration of timeslots in the first embodiment.

FIG. 4A is a data burst structure of the second embodiment having the first TFCI field modified.

FIG. 4B is a data burst structure of the second embodiment having the second TFCI field modified.

FIG. 4C is a data burst structure of the second embodiment having both TFCI fields modified.

FIG. 4D is an example allocation/configuration of timeslots in the second embodiment.

FIG. 5G is an example allocation/configuration of timeslots in the third embodiment.

FIG. 6A is a data burst structure of the fourth embodiment having an interference information field located in data field 1.

FIG. 6B is a data burst structure of the fourth embodiment having an interference information field located in data field 2.

FIG. 6C is a data burst structure of the fourth embodiment having an interference information field located in the midamble.

FIG. 6D is an example allocation/configuration of timeslots in the fourth embodiment.

FIG. 7A is the data burst structure of the fifth embodiment.

FIG. 7B is an example allocation/configuration of timeslots in the fifth embodiment.

FIG. 8A is the data burst structure of the sixth embodiment.

FIG. 8B is an example allocation/configuration of timeslots in the sixth embodiment.

FIG. 8C is an example allocation/configuration of timeslots in an alternative to the fifth embodiment.

DETAILED DESCRIPTION OF THE PREFERRED EMBODIMENT(S)

The present invention will be described with reference to the drawings figures wherein like numerals represent like elements throughout.

Figure 1:
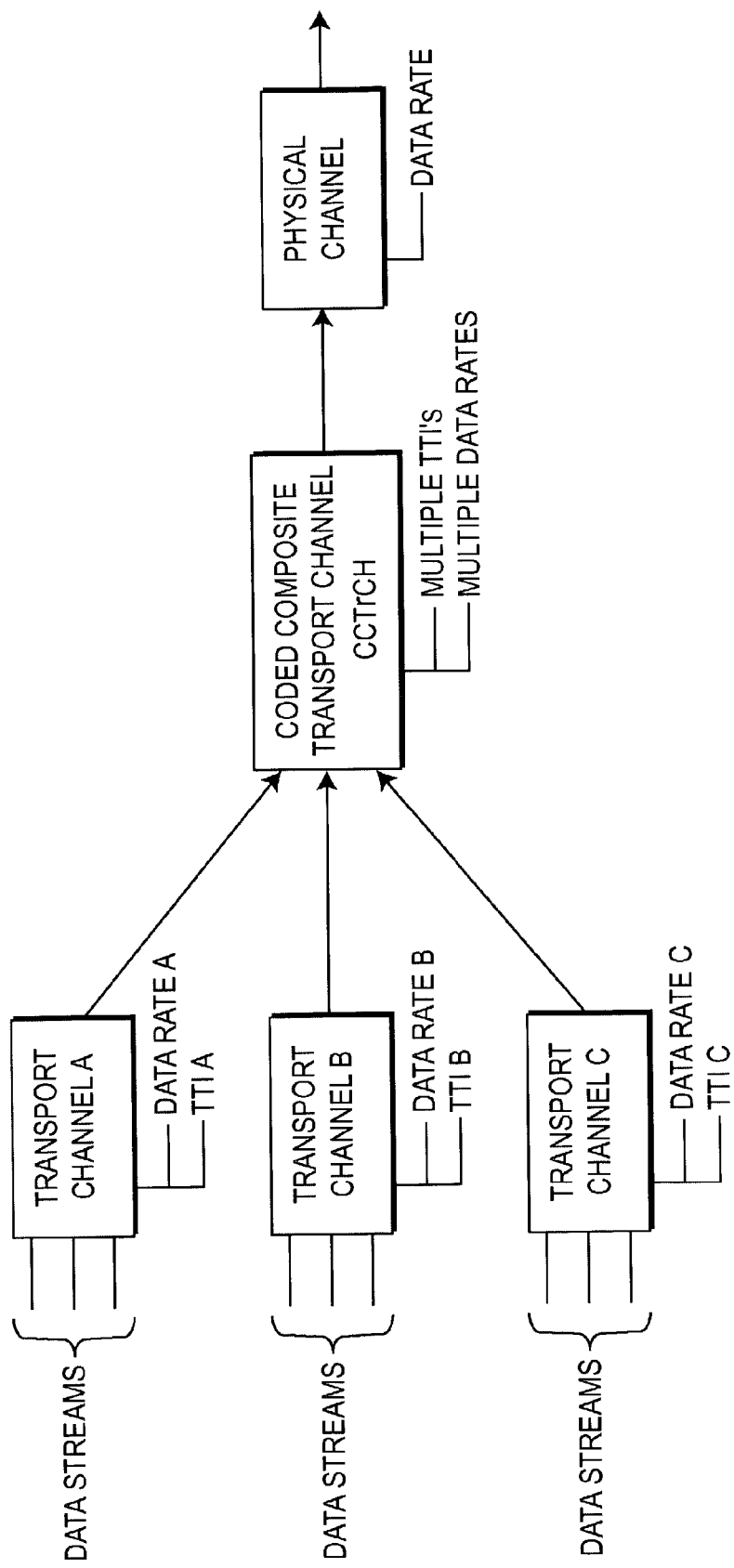
FIG. 1 is a block diagram of individual data streams being combined into a physical channel.
Figures 2A, 2B:
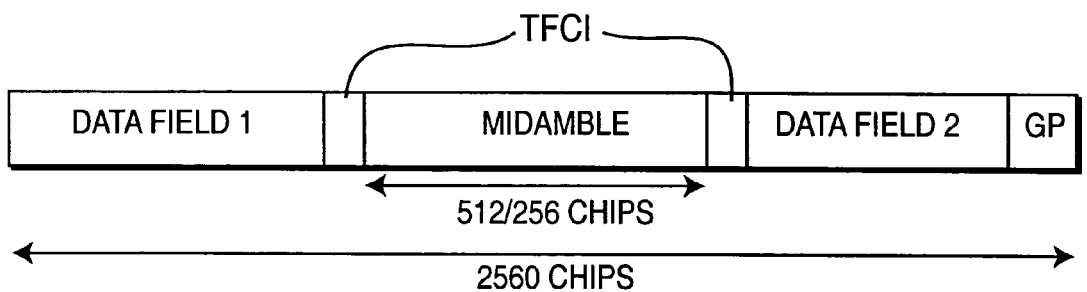
FIG. 2A is the result of a prior art code mapping process.
FIG. 2B is a prior art data burst.

Referring to FIG. 2B, a prior art data burst is shown. The data burst comprises two data fields separated by a midamble which are followed by a guard period (GP). The TFCI is transmitted within one or both of the data fields of the burst. The number of coded TFCI bits depends upon the number of possible TFCs that are supported. Since the TFCI is transmitted within the data fields, each bit required to transmit the TFCI reduces the number of user data bits. Therefore, it is desirable to limit the number of TFCI bits.

The location of the TFCI adjacent to the midamble allows for the best possible transmission, since interference from the midamble can be canceled and the channel estimate is most reliable for bits adjacent to the midamble. As those of skill in the art should realize, the data fields comprise both user data and physical control fields, although these fields will not be described in further detail hereinafter.

The present invention comprises six different embodiments for performing dynamic link adaptation. The first embodiment, as shown in FIGS. 3A–3E, comprises adding a new control field to the data burst to indicate which particular timeslots are active, and which timeslots should be avoided. For example, as shown in FIG. 3A, a control field has been added to data field 1. FIG. 3B shows the control field added to data field 2. Alternatively, FIG. 3C shows the control field as part of the midamble. FIG. 3D shows the control field added to both data field 1 and data field 2. Although the control field(s) are shown in a particular location within the data fields, they may be located in any portion of the data field.

In any of the alternatives shown in FIG. 3A–3D, it is important to note that the control field identifies the timeslots to which the receiver should look for valid data. The data in the control field may refer to "active" timeslots which include valid data; may include "inactive" timeslots which have invalid data and are to be avoided (hereinafter "inactive" timeslots); or may include both active and inactive timeslots. The active or inactive timeslots may be identified individually, or the identifier may include a bit string, with a one indicating an active timeslot and a zero indicating an inactive timeslot. It also should be noted that the control field can comprise a separately delineated control field or may simply reside in a portion of the data fields.

Referring to FIG. 3E, the allocation/configuration of timeslots using the method of the first embodiment is shown. In this example, it is assumed that the control fields shown in FIGS. 3A–3D indicate that timeslots S4, S6 and S7 are active, and that S5 is inactive. Accordingly, timeslot S5 is not used, and codes A1–A12 are allocated/configured in timeslots S4, S6 and S7. This permits the system to avoid an "offending" timeslot, such as timeslot S5 in this example, which will not adequately support a communication without a substantial increase in UE power output.

Referring to FIGS. 4A–D, a second embodiment of the present invention is shown. In this embodiment, one or both of the TFCI fields are expanded and/or modified to include the extra data regarding which timeslots are active and which are inactive. FIG. 4A shows the first TFCI field expanded and/or modified in order to include the extra data; FIG. 4B shows the second TFCI field expanded and/or modified in such a way; and FIG. 4C shows both TFCI fields expanded and/or modified in such a way.

Referring to FIG. 4D, the allocation/configuration of the timeslots using the method of the second embodiment is shown. In this example, it is assumed that the control fields shown in FIGS. 4A–4C indicate that timeslot S6 is inactive and timeslots S4, S5 and S7 are active. Accordingly, the codes are assigned/configured such that timeslot S6 is avoided and timeslots S4, S5 and S7 are assigned/configured with the codes in consecutive order. Timeslot S4 will be filled first, followed by timeslots S5 and S7 consecutively.

Figure 5A:
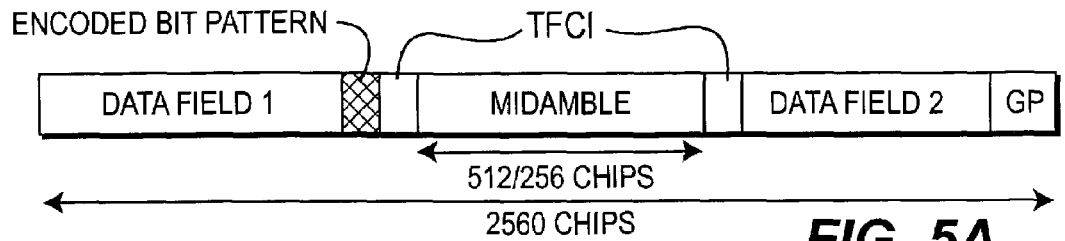
FIG. 5A is a data burst structure of the third embodiment having an encoded bit pattern in data field 1.
Figure 5B:
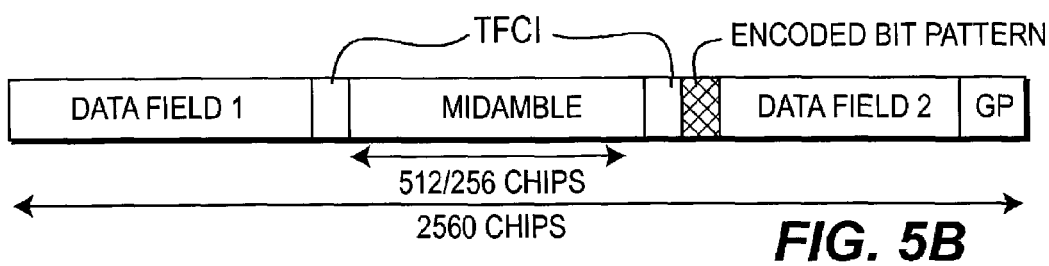
FIG. 5B is a data burst structure of the third embodiment having an encoded bit pattern in data field 2.
Figure 5C:
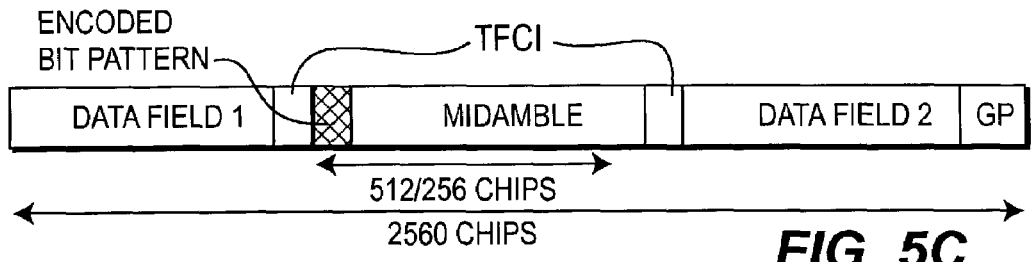
FIG. 5C is a data burst structure of the third embodiment having an encoded bit pattern in the midamble.

Referring to FIGS. 5A–5F, a third embodiment is shown. In this embodiment, a special encoded bit pattern is added to one or both of the data fields or the midamble within the data burst; for example data field 1 as shown in FIG. 5A, data field 2 as shown in FIG. 5B or the midamble as shown in FIG. 5C. By including this special encoded bit pattern within a data burst, the transmitter indicates that these are inactive timeslots, which are to be avoided. When the receiver detects the special encoded bit pattern in the data burst, the information associated with that timeslot is discarded or otherwise ignored.

Figure 5D:
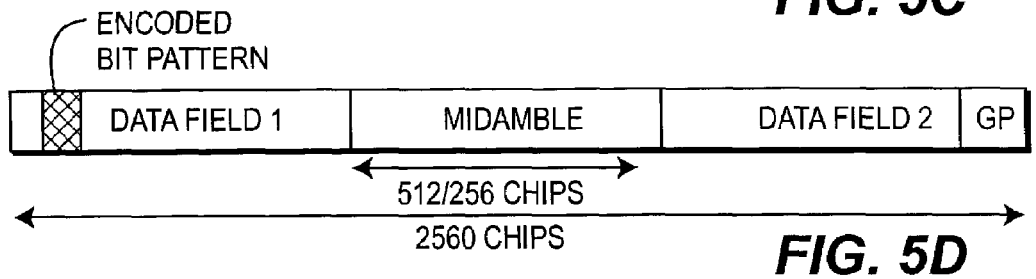
FIG. 5D is a data burst structure of the third embodiment without TFCI fields, having an encoded bit pattern in data field 1.
Figure 5E:
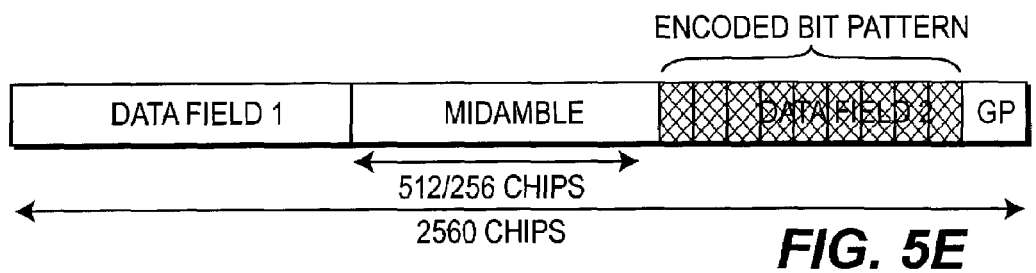
FIG. 5E is a data burst structure of the third embodiment without TFCI fields, having an encoded bit pattern in data field 2.
Figure 5F:
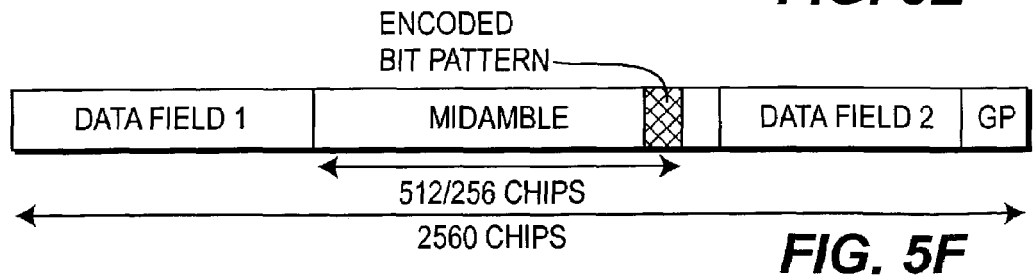
FIG. 5F is a data burst structure of the third embodiment without TFCI fields, having an encoded bit pattern in the midamble.

FIGS. 5D–5F are similar to FIGS. 5A–5C except that the data burst does not include the TFCI fields. As shown in FIG. 5D, the encoded bit pattern may be included at any location within data field 1. Alternatively, as shown in FIG. 5E, the encoded bit pattern may be located within data field 2, or as shown in FIG. 5F may be located within the midamble. Although the encoded bit pattern located within data field 1 or data field 2 is preferably located close to the midamble, this is not required in the present embodiment or any of the other embodiments. Additionally, the encoded bit pattern may be minimal, as shown in FIGS. 5A–5D and 5F, or may comprise most or all of the data field as shown in FIG. 5E.

The length of the bit pattern is such that a high gain coding scheme may be used so that it can be received with reduced power. Thus, for example, if a 256 chip sequence is used, then the power requirements are reduced relative to a spreading factor of 16, by 12 dB. In one alternative, a sync-like (Golay) sequence that does not require channel estimation may be used.

FIG. 5G shows an allocation/configuration of timeslots using the method of the third embodiment. In this example, it is assumed that the data bursts shown in FIGS. 5F have indicated that timeslot S6 has been designated as inactive. Thus, the data burst associated with timeslot S6 will include the special encoded bit pattern. As a result, timeslots S4, S5 and S7 will be allocated/configured consecutively and timeslot S6 will be avoided.

The fourth embodiment of the present invention ranks all active timeslots in order of decreasing interference, and then the channel allocation/configuration is made based upon the interference levels.

Preferably, the transmitter periodically performs interference measurements in each timeslot for the amount of interference and sends this information to the receiver. Once the timeslots are ranked based upon the interference level, the timeslots with the least interference are filled first and the timeslots with the worst interference are filled last. The interference information, or rank, may be transmitted from the transmitter to the receiver in one of the fields of the data burst, or a new field may be created; for example data field 1 as shown in FIG. 6A, data field 2 as shown in FIG. 6B or the midamble as shown in FIG. 6C.

The measurements used for ranking the timeslots are those which are well known to those of skill in the art, such as the channel quality CQ measurements that are signaled between the RNC, the RNS and the Node B in a 3G system. The node B may also use higher layer signaling with an acknowledgement to prioritize the channel allocation/configuration.

FIG. 6D illustrates an allocation/configuration of timeslots using the method of the fourth embodiment. In this example, it is assumed that timeslot S6 has the least amount of interference, timeslot S5 has the second least amount of interference, timeslot S7 has the third least amount and timeslot S4 has the most interference. Accordingly, the timeslots will be filled in the following order: S6, S5, S7 and S4, as shown in FIG. 6D.

The fifth embodiment in accordance with the present invention creates an even distribution of data across all timeslots. In this embodiment, referring to FIG. 7A, a TFC is chosen, and the corresponding TFCIs are transmitted in the TFCI fields, that reduce the data rate evenly across all timeslots to the point where the offending timeslot can support the data transmission. This embodiment is the most simple solution since the TFCIs that are transmitted are the same as in the prior art. However, the system allocates/configures timeslots and codes such that the data is evenly distributed across all of the timeslots.

The method of the fifth embodiment results in an allocation/configuration of timeslots shown in FIG. 7B. As shown, the codes are allocated such that the data is distributed evenly across all timeslots. This embodiment has the additional advantages that no new fields are needed and no synchronization between the transmitter and receiver has to be performed in order to make a notification of active or inactive timeslots since all timeslots are active.

In a sixth embodiment in accordance with the present invention shown in FIG. 8A, the inactive timeslot, and all timeslots thereafter, are not used to send any information. The TFCI is used to convey which timeslots should be used. However, when the UE calculates maximum allowable power will be exceeded in a certain timeslot, such as timeslot S5, that timeslot and all subsequent timeslots are not used.

The result of the sixth embodiment is a code allocation/configuration shown in FIG. 8B. In this example, it is assumed that timeslot S5 is the inactive timeslot. Accordingly, since the offending timeslots and all timeslots thereafter are discarded, only timeslot S4 will be used and only codes A1–A5 will be allocated/configured.

In an alternative to the embodiment, the inactive timeslot may still be used, albeit in a lesser capacity. As shown in FIG. 8C, less codes may be assigned to that timeslot to reduce the burden on the timeslot.

A summary of the different embodiments of the present invention is shown in Table 1 below.

TABLE 1

| EMBODIMENT | FIGS. | |
|---|---|---|
| First | 3A–3E | Add a new control field to one or both data fields, or to the midamble, to indicate active and/or inactive timeslots |
| Second | 4A–4D | Modify one or both TFCI fields to indicate active and/or inactive timeslots |
| Third | 5A–5G | Add an encoded bit pattern to all timeslots that are inactive |
| Fourth | 6A–6D | Rank timeslots in order of decreasing interference; use the timeslots with the least interference first |
| Fifth | 7A–7B | Choose a TFC such that the "offending" timeslot can support a reduced data rate, and average resource allocations across all timeslots |
| Sixth | 8A–8B | Maximum power is determined for each specific timeslot. Resource units are not applied to the timeslot that exceeds maximum allowable power and all timeslots thereafter. |

It should be noted that one drawback in implementing the present invention is the location of the TFCI and the control information for active and inactive timeslots, (hereinafter "timeslot information"). Since the TFCI typically exists only in certain timeslots, it is possible to have a communication that uses five timeslots, but designates only timeslot 2, or timeslots 1 and 4, to have the TFCI and/or the timeslot information. The TFCI and the timeslot information are necessary to synchronize the transmitter and the receiver in the processing of the data. However, there may be instances when the only timeslots that have the TFCI or the timeslot information will be the timeslots that exceed the maximum allowable transmission power.

For the first four embodiments of the present invention and described with reference to FIGS. 3A–6D, if the TFCI or the timeslot information are in only the timeslots that have been designated as inactive, the communication will fail.

One solution to this problem is to put the TFCI and timeslot information in at least two timeslots; and potentially every used timeslot when data loss is a greater concern. This will ensure that if the receiver receives a timeslot, it will also receive the TFCI and timeslot information.

For the fifth and sixth embodiments shown and described with reference to FIGS. 7A–8B, the TFCI problem does not exist. For the fifth embodiment, the data rate is reduced, but all timeslots are still used and the TFCI and timeslot information will always be available. The sixth embodiment will always include the TFCI and timeslot information in the first timeslot.

It should be noted that although the present invention has been described with reference to the uplink, it is equally applicable to the downlink; and utilizing the teachings of the embodiments as described herein in both the uplink and the downlink are contemplated herein as within the scope of the present invention.

While the present invention has been described in terms of the preferred embodiment, other variations, which are within the scope of the invention as outlined in the claims below will be apparent to those skilled in the art.

What is claimed is:

1. A User Equipment (UE) that supports a communication using a wireless hybrid time division multiple access (TDMA)/code division multiple access (CDMA) format by selecting and utilizing at least one timeslot from a plurality of available timeslots and at least one code from a plurality of codes, the UE comprising:
   means for calculating, for each available timeslot, the power required to transmit data;
   means for determining whether said calculated power for each timeslot exceeds a threshold;
   means for removing timeslots exceeding said threshold from said available timeslots to determine remaining timeslots;
   means for signaling an identifier of said remaining timeslots to another communicating unit; and
   means for using said remaining timeslots and the codes within said remaining timeslots to support the communication.

2. The UE of claim 1, wherein said signaling means further includes means for using a data burst comprising first and second data fields, separated by a midamble, followed by a guard period.

3. The UE of claim 2, wherein said identifier lists the remaining timeslots.

4. The UE of claim 2, wherein said identifier lists the exceeding timeslots.

5. The UE of claim 2, wherein said identifier lists the remaining and exceeding timeslots.

6. The UE of claim 3, wherein said identifier is located within at least one of said data fields.

7. The UE of claim 3, wherein said identifier is located within said midamble.

8. The UE of claim 2, wherein said data burst further comprises two TFCI fields, located before and after said midamble.

9. The UE of claim 8, wherein said identifier is located with at least one of said TFCI fields.

10. The UE of claim 1, wherein the codes are allocated consecutively.

11. A User Equipment (UE) which implements dynamic link adaption in a time division duplex (TDD) communication system by transmitting timeslot and code allocation information in a data burst, the data burst having a plurality of fields including two data fields separated by a midamble field, the UE comprising:

means for transmitting, in at least one of said fields, an indication of timeslots to be used; and means for allocating codes to said used timeslots in consecutive order until all codes have been assigned.

12. The UE of claim 11, wherein said indication is transmitted within at least one of said data fields.

13. The UE of claim 11, wherein said indication is transmitted within said midamble field.

14. The UE of claim 11, wherein said data burst further includes first and second TFCI fields, said first TFCI field located before said midamble field and said second TFCI field located after said midamble field, whereby said indication is transmitted within at least one of said TFCI fields.

15. A User Equipment (UE) which signals code and timeslot assignments to support a communication of a user in a wireless hybrid time division multiple access (TDMA)/code division multiple access (CDMA) communication system, utilizing at least one timeslot from a plurality of available timeslots and at least one code from a plurality of codes, the UE comprising:

means for calculating, for each available timeslot, the power required to transmit data;

means for determining whether said calculated power for each timeslot exceeds a predetermined threshold;

means for loading information to support said user communication in a first set of timeslots that do not exceed said predetermined threshold;

means for loading an encoded bit pattern in a second set of timeslots that exceed said predetermined threshold;

means for signaling said first and second sets of timeslots to another communicating unit; and means for using said information from said first set of timeslots to support the communication.

16. The UE of claim 15, wherein said loading means uses consecutive codes from said plurality of codes.

17. A User Equipment (UE) which signals code and timeslot assignments in a time division duplex communication format, the UE communicates with at least a second unit, utilizing at least one timeslot from a plurality of available timeslots and at least one code for each timeslot from a plurality of codes for each timeslot, the UE comprising:

means for calculating the power required to transmit data for each available timeslot;

means for determining whether said calculated power exceeds a threshold;

means for removing timeslots exceeding said threshold from said available timeslots to determine remaining timeslots;

means for signaling an identifier of said remaining timeslots; and means for using said remaining timeslots to support the communication.

18. The UE of claim 17, wherein at least one code comprises a plurality of codes, and wherein said using means uses codes in consecutive order.

19. A User Equipment (UE) which implements dynamic link adaption in a time division duplex communication system by transmitting timeslot and code allocation information in a data burst, the data burst having a plurality of fields including two data fields separated by a midamble field, the UE comprising:

means for determining inactive timeslots and active timeslots;

means for transmitting, in at least one of said fields, an indication of active timeslots;

means for consecutively allocating codes to active timeslots until all codes have been allocated.

\* \* \* \* \*

UNITED STATES PATENT AND TRADEMARK OFFICE
CERTIFICATE OF CORRECTION

PATENT NO. : 6,985,457 B2  
APPLICATION NO. : 10/152104  
DATED : January 10, 2006  
INVENTOR(S) : Zeira et al.

It is certified that error appears in the above-identified patent and that said Letters Patent is hereby corrected as shown below:

On Title Page

Item (54)  
Delete "Adaption" and insert therefor --ADAPTATION--.

Item (56), U.S. PATENT DOCUMENTS, page 1, right column, after line 3, insert new line, --6,519,240  02/2003  Dillinger et al--.

Item (56), U.S. PATENT DOCUMENTS, page 1, right column, delete line 5, "2002/0001617  A1  7/2002  Miya et al."

Item (56), FOREIGN PATENT DOCUMENTS, page 1, right column, insert new line 1, --DE 198 20 736  05/1998--.

Item (56), OTHER PUBLICATIONS, page 1, right column, line 1, after "et al.", delete "20001" and insert therefor --2001--.

Item (56), OTHER PUBLICATIONS, page 2, left column, line 7, after "http://www.3gpp.org/ftp", delete "/lsg" and insert therefor --/tsg--.

Item (56), OTHER PUBLICATIONS, page 2, right column, line 7, after "http://www.3gpp.org/ftp", delete "/lsg" and insert therefor --/tsg--.

Title Page, Page 2 Item (56), OTHER PUBLICATIONS, left column, insert new copy --Forkel et al., "Dynamic Allocation of Capacity in UTRA TDD Systems", 3G Mobile Communication Techologies, March 26-28, 2001, Conference Publication No. 477, IEE 2001.--.

At column 1, line 1, after the word "LINK", delete "ADAPTION" and insert therefor --ADAPTATION--.

UNITED STATES PATENT AND TRADEMARK OFFICE
CERTIFICATE OF CORRECTION

PATENT NO. : 6,985,457 B2
APPLICATION NO. : 10/152104
DATED : January 10, 2006
INVENTOR(S) : Zeira et al.

It is certified that error appears in the above-identified patent and that said Letters Patent is hereby corrected as shown below:

At column 1, line 30, after the word "be", delete "either".

At column 2, line 63, after the word "code", delete "$(A_{1-A12})$" and insert therefor --$(A_1-A_{12})$--.

Signed and Sealed this

Twenty-sixth Day of December, 2006

JON W. DUDAS
*Director of the United States Patent and Trademark Office*